Aug. 31, 1937.  J. D. FERRY  2,091,675
MATERIAL TREATING APPARATUS
Filed July 18, 1934  3 Sheets-Sheet 1

INVENTOR
JOSEPH D. FERRY
BY
Attorney

Patented Aug. 31, 1937

2,091,675

UNITED STATES PATENT OFFICE 2,091,675

MATERIAL TREATING APPARATUS

Joseph D. Ferry, Harrisburg, Pa.

Application July 18, 1934, Serial No. 735,891

30 Claims. (Cl. 146—194)

This invention has reference to a material treating mechanism and although especially designed for use in the preparation of potato chips, the invention is, of course, adaptable to use in connection with other articles of food.

The application will be found to feature matter extracted from my earlier application filed September 3, 1931, and serially numbered 561,050.

Briefly, the invention looks to the preparation and handling of potato slices for presentation to a frying unit and contemplates, among other things, a highly convenient and expeditious arrangement by which newly cut potato slices are directed through a liquid bath of an actively circulating fluid and are thus relieved of a substantial portion of the starch formerly therein, and such arrangement also makes provision for the separation of small unusable potato slices from those of commercial sizes before those of commercial sizes are furnished to the frying unit. By thus separating the small unusable slices from those of commercial sizes as one of the steps in preparation for the frying process, there is effected an appreciable conservation of fuel necessary for heating the contents of the frying unit, and at the same time, there is avoided congestion or accumulation of small unusable slices in the frying unit.

Also, the process of separating the small unusable slices from those of commercial sizes as a preliminary to the frying process, brings about the virtually complete absence of small unusable chips from the completed chips in bulk and, in tnis manner, the appearance, desirability and saleability of the potato chips is materially enhanced, this being in contrast to the previous necessity of manually culling the small, unusable chips from those of commercial size.

More particularly, the preparation of the newly cut and as yet uncooked potato slices to remove starch therefrom and to cull the small unusable slices from those of commercial sizes as set forth herein, embodies a liquid bath having a definitely predetermined compound circulation which acts to separate the slices, one from the other, upon entering the bath. Such circulation thus avoids congestion at the point where the slices enter the bath, and at the same time, brings about a sharply defined and regulated movement of the uncooked slices through a rotating drum by which the potato slices are turbulated or tumbled and are thus thoroughly subjected to the action of the liquid bath, it being observed in passing that the regulated movement of the slices brings about the uniform treatment of all slices so that the completed product will be of relatively uniform crispness.

Another aspect of the invention has to do with the formation of the slice handling drum, the peripheral body of which will be found to have passages or openings of a form inducing the outward flow of liquid therethrough to the end that the slices suspended in the liquid bath and carried thereby are urged outward toward the circumferential wall of the drum to be swept down through the bath in a rather long arcuate path about the longitudinal axis of the drum and then brought up to a point adjacent the surface of the bath to be advanced more or less diagonally across such surface to be re-engaged by the descending side of the drum and again carried down through the liquid bath, all of which brings about the efficient and expeditious removal of starch from the uncooked slices.

In addition, the formation and the size of the openings in the drum will be found to provide for the separation of the small unusable chips from those of commercial sizes as one step in preparation for the frying process.

By way of further brief preliminary reference to the invention, it might be pointed out that the same embodies a means by which the circulation of the slice treating liquid bath is caused to deposit the newly treated and as yet uncooked potato slices upon a conveyor by which the slices are subjected to a partial drying and drainage, and are conducted to the frying unit.

It has been found that the movement of the uncooked potato slices through the liquid bath and the extraction of the starch from such slices results in the accumulation of a rather light foam on the surface of the liquid bath, and another feature of this invention will be found to reside in the provision of means for carrying off this foam as it accumulates so as to prevent such foam from interfering with advantageous operation or possibly over-flowing upon the floor.

Other objects and advantages will be apparent during the course of the following description.

In the accompanying drawings forming a part of this application and in which like numerals are employed to designate like parts throughout the same.

In the drawings, wherein for the purpose of illustration is shown a preferred embodiment of the invention, the numeral 215 designates a peeler of any suitable design and which is positioned in feeding relation to a trough 216. For the purpose of convenience, the trough 216 may be approximately waist high and is fully open at the top thereof for the visual inspection of the newly peeled potatoes. This permits bad and spotty potatoes to be removed during passage through the trough and before being presented to the slicer.

Any suitable source of power such as an electric motor 217 may be employed to drive the peeler. The drive may be through an endless chain 218 or the like.

Figure 1:
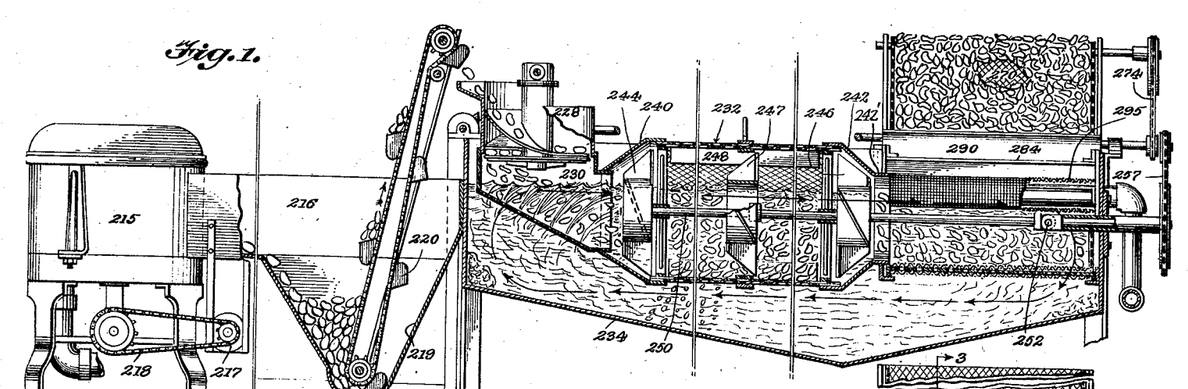
Figure 1 is a detail longitudinal sectional view through a material treating mechanism embodying the invention.

By reference to Figure 1, it will be seen that a bin 219 is positioned in receptive relation to the potatoes from the trough 216 and is formed with converging walls defining a sort of well for potatoes. It is through this well that the buckets 220 of an endless conveyor successively dip to pick up predetermined quantities of potatoes for presentation to a slicing mechanism.

Figure 2:
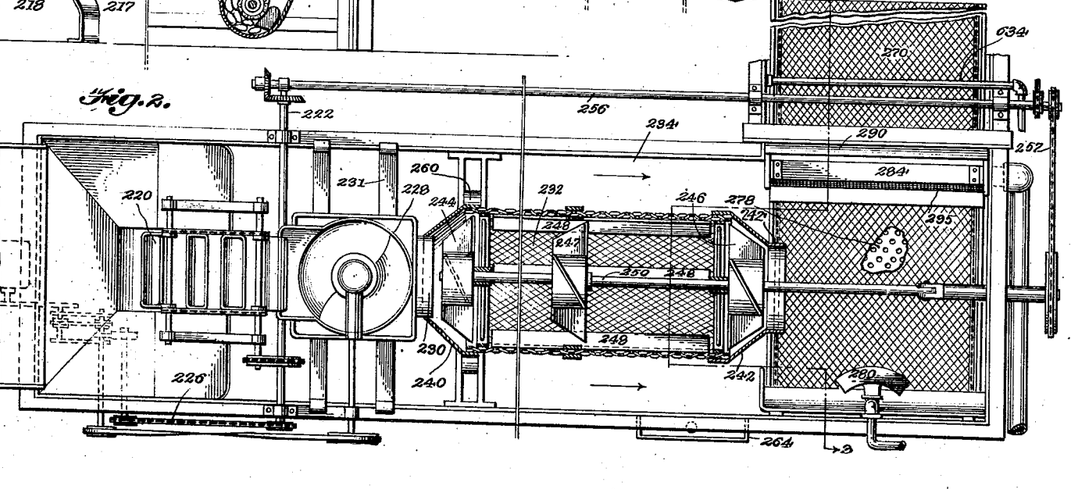
Figure 2 is a fragmentary top plan view of the same.

In Figure 2, it is illustrated that the bucket conveyor has connection with a cross shaft 222 which may, of course, be connected to any suitable source of power through a motion transmitting mechanism 226.

The potatoes picked up by the bucket conveyor are furnished successively and in predetermined quantities to a slicer 228 by which the potatoes are cut into slices of uniform thickness throughout so that the subsequent frying of the potato slices will result in the production of potato chips of uniform crispness, color, etc.

Referring now to Figure 1, it will be seen that the slicer 228 is in feeding relation to a slice receiving member or basket 230 located at the inlet to a rotatable drum.

The basket 230 is provided with pairs of laterally projecting arms 231 slidably mounted upon the frame or other fixed part of the machine so that the longitudinally extending, horizontally disposed outlet portion of the basket may be moved into or out of telescopic relation with the associated drum 232. The shiftable mounting of the basket permits the basket to be withdrawn from telescopic engagement with the drum so that the drum may in turn be removed for cleaning or other purposes.

From Figure 1 it will be seen that a substantial portion of the basket or inlet elbow is submerged in the liquid within a tank 234 within which the drum 232 revolves so that the slices, upon leaving the slicer and entering the basket 230, are introduced into a body of liquid employed in treating the newly cut potato slices. In explaining this, it is pointed out that the bottom of the basket is definitely inclined to intersect the longitudinal axis of the drum at an acute angle and is reticulated for the passage of the circulating liquid within the tank.

More specifically, the tank fluid enters the basket 230 from below and picks up the entering potato slices to separate the same, one from the other, at the point where the same enter the tank, and to conduct the slices through the tank in the intended manner.

The reticulation of the inclined bottom of the basket 230 defines a battery of nozzles through which the water or other tank liquid is directed under sufficient pressure to definitely agitate or ebullate the liquid as it circulates through the chamber of the basket 230 so as to bring about the separation of the potato slices including those upon the surface of the tank fluid. In this connection, it might be said that the columns of fluid from the nozzles or orifices in the bottom of the basket practically break through the surface of the fluid above and thus act upon the entering slices although, of course, the columns of fluid from the basket jets do not extend sufficiently far above the surface of the fluid to interfere with the operation of the slicer.

The slicer operates to form the potato slices individually and to feed the same to the circulating fluid individually and successively. Now, the forceful admission of the tank fluid to the inlet basket 230 puts into circulation the slices immediately upon entering the bath so that the surface starch is removed from the slices before the slices are allowed to adhere one to the other. The fluid circulation clearly disclosed by arrows in Figure 1 provides a simple means by which the slices upon entrance into the basket are held separate and are put into motion so that the slices are uniformly subjected on all sides to the starch removing action of the tank fluid.

As illustrated in Figures 1 and 2, the inlet and outlet end portions 240 and 242, respectively, of the drum are of imperforate material and are provided internally with impellers 244 and 246, respectively, cooperating with a centrally located impeller 247 in inducing a definite longitudinal circulation of fluid through the drum and, in fact, through the entire tank. Also, the inlet and outlet end portions 240 and 242 of the drum are shown to be tapered to accelerate the flow of fluid at these points. This aids materially in the introduction of slices into the drum and in the discharge of slices from the drum.

The direction of circulation of fluid through the tank is indicated by the arrows in Figure 1, and it is this circulation that is relied upon to separate the potato slices, one from the other, upon entering the basket 230 and to conduct the slices through the tank.

Figures 3, 4, 5, 6:
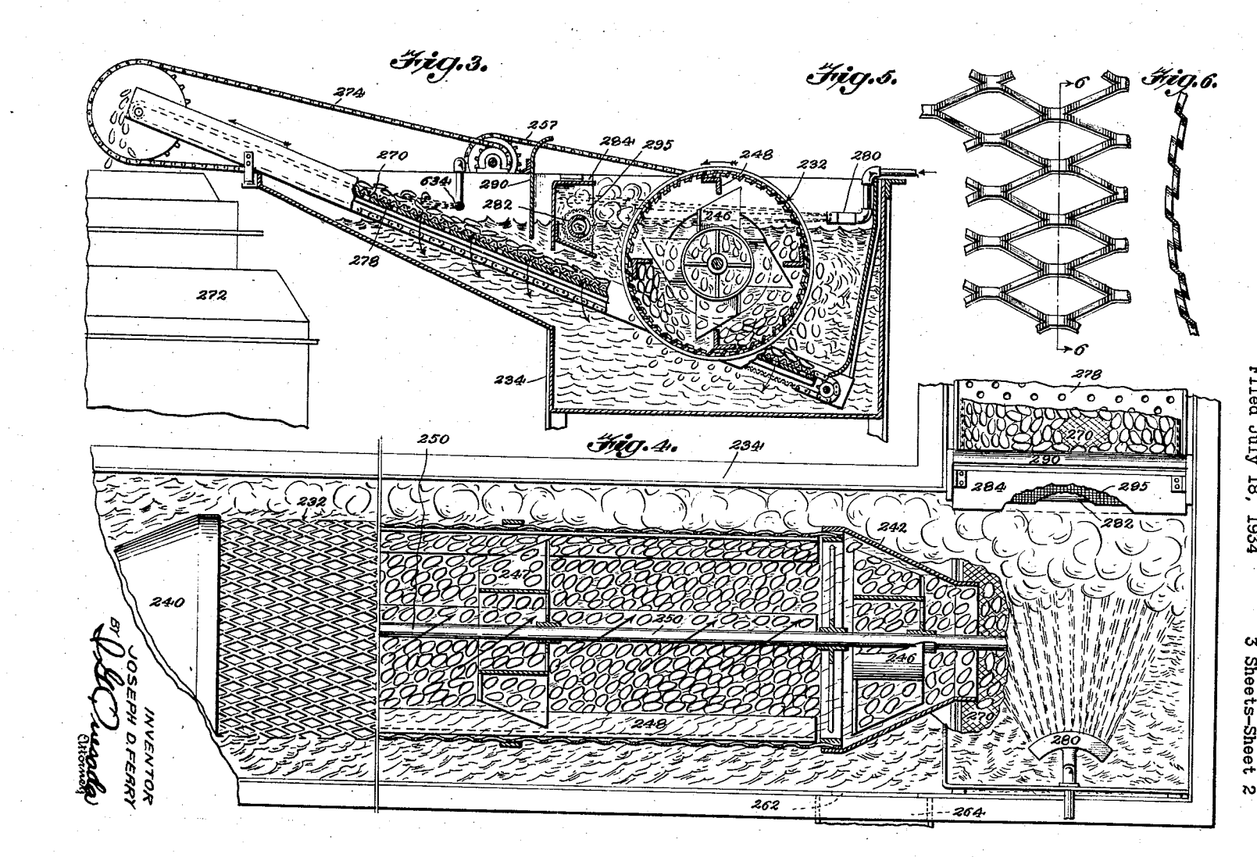
Figure 3 is a detail transverse sectional view through the same, the view being taken on line 3—3 of Figure 2.
Figure 4 is an enlarged fragmentary plan view of the same disclosing the slice handling drum and associated parts.
Figure 5 is a side elevation of a portion of the slice handling drum.
Figure 6 is a transverse sectional view on the line 6—6 of Figure 5.

The body of the drum 232 is shown to be reticulated for the free passage of water or other slice treating fluid, and in this connection, attention is invited to Figures 4, 5 and 6 in which it is shown that the body is formed of expanded metal. That is to say, the body of the drum is formed from one or more sheets of initially flat metal having a plurality of staggered rows of incisions allowing the metal to be expanded and thus form staggered diamond-shaped openings.

Otherwise expressed, the openings in the body of the drum are bounded by or are formed with a plurality of mutually and directly connected webs inclined transversely with respect to the intersecting radius lines of the drum and having leading edges presented inward to induce the rapid radially outward flow of fluid through said drum, thereby urging the slices in the drum in the direction of the periphery of the drum.

It will be seen that the tank fluid has a longitudinal and diagonal flow through the drum, producing a compound movement by which the potato slices are advanced and are directed diagonally, all within the drum. With the drum revolving at a predetermined rate, the slices are thus subjected to a well-defined arcuate and diagonal movement so that all slices are treated uniformly.

That is to say, the potato slices are subjected to a plurality of diagonal advances across the surface portion of the drum liquid and after such advances, the potato slices are swept down through the drum liquid in arcuate paths about the longitudinal axis of the drum which leads to the statement that the arcuate travel of the slices alternates with the diagonal advances of the slices so as to subject the slices to a generous liquid treatment in a drum of a given length.

As suggested in Figure 3, the drum may be provided with a plurality of internal, longitudinally extending ribs or flanges 248 to engage the outwardly moving potato slices and definitely submerge the same in the circulating fluid. As the potato slices come to the surface, the same will float diagonally across the fluid as suggested by arrows in Figure 4 and will be encountered by the oppositely located flanges 248 and again submerged in the fluid. By increasing the height of the fluid within the drum, there is effected a reduction in the surface travel of the slices from one side of the drum to the other and this, of course, retards the endwise movement of the slices through the drum, because at the time the slices are being swept beneath the surface of the fluid there is no appreciable advance of the slices.

As illustrated in Figure 1, the inlet and outlet openings of the drum 232 are located partly above and partly below the level of the tank liquid. This allows of the continuous and uniform discharge of the slices from the drum as distinguished from the choking of the outlet from the drum were the liquid level above the outlet from such drum.

From this, it may be seen that the speed of travel of the slices is determined first by the speed of the drum itself and by the height of the solution within the tank 234.

It has been found that by urging or directing the potato slices outward into contact with the drum, such slices are caused to have a more extensive travel through the fluid than would otherwise be the case.

As previously stated, the form of the openings in the body of the drum is responsible for the accelerated lateral flow of fluid through the drum. Such lateral flow of the fluid through the drum, not only moves the slices into position for engagement by the flanges 248, but at the same time, locates the potato slices in the region of the greatest fluid circulation, so that in a tank of relatively short length the desired treatment of the slices is accomplished with a high degree of efficiency.

The starch extracted from the potato slices settles in the bottom of the tank and at suitable intervals may be removed and employed for the commercial manufacture of starch.

At the same time, the small unusable potato slices, resulting from slicing the ends of the potatoes, are allowed to pass through the openings in the expanded metal forming the body of the drum and such slices collect with the starch in the bottom of the tank. It will be seen that the circulation of fluid in the tank is in an oval path, with the return or lower run of the fluid beneath the drum and serving to deposit the starch and small unusable chips principally adjacent the inlet to the tank where the same are available for convenient removal.

By reason of the automatic separation of the small, unusable slices from those of commercial sizes, as an incident to the washing operation, there is effected a reduced consumption of cooking oil and fuel. In addition, the automatic separation of the small, unusable slices from those of usable size avoids the need of manual separation of the usable from the small, unusable chips after the frying operation.

As illustrated in detail in Figure 2, the drum is rotatably supported by rollers 260 carried by brackets secured to the sides of the tank 234.

Figures 7, 8:
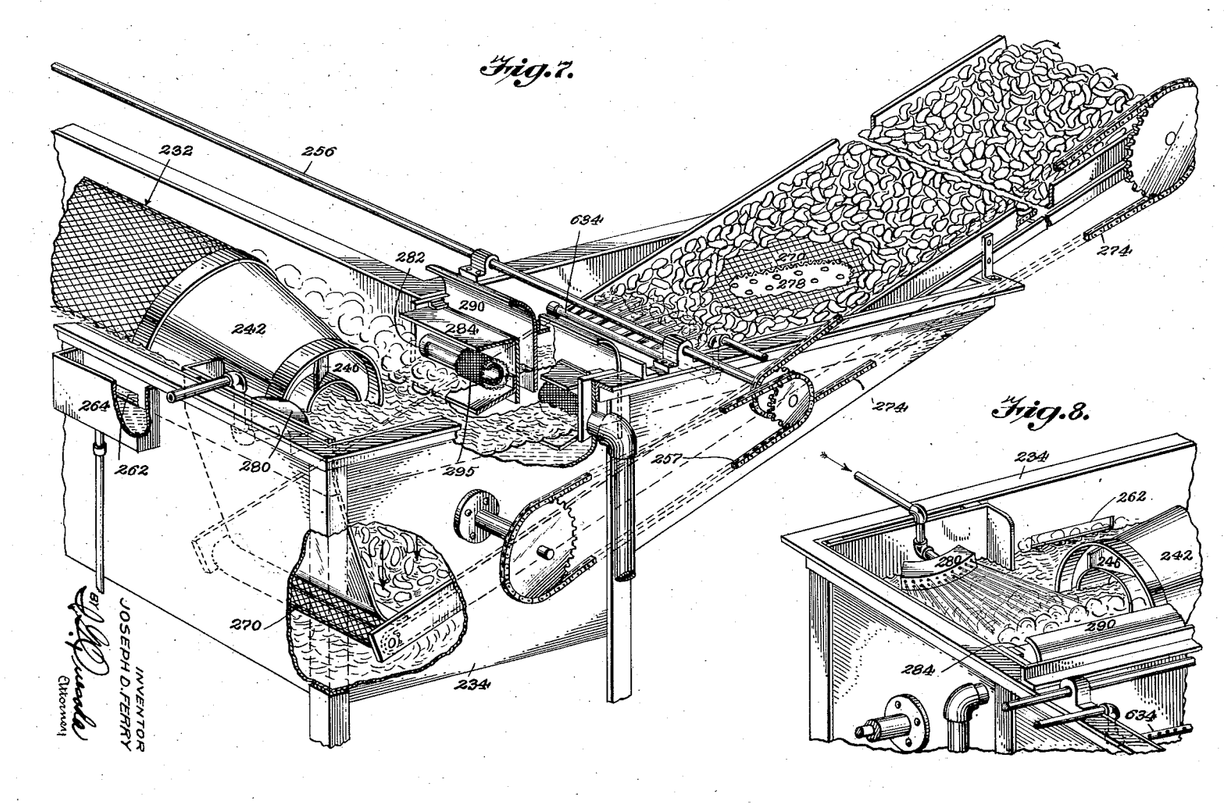
Figure 7 is a fragmentary perspective of the outlet end portion of the slice preparing and handling mechanism.
Figure 8 is a similar view taken from another angle.

Attention is invited to Figure 7 in which it is disclosed that one side of the tank is provided with a port 262 opening into a collector 264 for dirt which accumulates on the surface of the fluid in the tank. That is to say, the fluid in circulating through the tank inevitably picks up potato eyes, dirt, etc., which accumulate on the surface and such particles are directed into the collector 264 to be carried off to a suitable point of disposal.

To facilitate the periodic removal of starch and small, unusable slices from the tank and the thorough cleaning of the tank, the shaft 250 extending lengthwise through the drum and having driving connection therewith, is provided with a pivotal connection 252 allowing the drum to be moved into or out of the tank. One end of the shaft 250 is connected with a drive shaft 256 through the intervention of a motion transmitting mechanism 257.

Of course, as a preliminary to the removal of the drum from the tank or the lowering of the drum into the tank, the basket 230 is retracted or moved to the left as viewed in Figures 1 and 2 so as to avoid interference with the intended movement of the drum.

By reference to Figure 2, it will be seen that the drive shaft 256 has connection with the cross shaft 222 of the elevating mechanism. However, it is obvious that the shaft 250 and the associated drum may be driven from any suitable source of power alone or in concert with other parts of the equipment.

Attention is now invited to Figure 2 in which it is illustrated that the outlet end 242 of the drum 232 is immediately above and in feeding relation to the lower end of an endless conveyor 270, this conveyor being in the nature of an endless reticulated, flexible movable body, preferably of woven metal, affording generous interstices for the passage of the fluid as suggested by the arrows in Figure 3. The lower or receiving end portion of the conveyor 270 extends below the level of the fluid in the tank 234 so that the force of such fluid is caused to deposit the newly washed slices upon the upper or ascending flight of the conveyor. This brings about the removal of the slices from the tank.

Since the slices leave the drum under the influence of the circulating fluid and are held more or less separate thereby, such slices are deposited upon the conveyor in like fashion.

As shown in Figure 3, the endless conveyor 270 ascends from a point below the outlet end of the drum to a point above and in feeding relation to a cooking or frying unit 272 for the slices or chips.

The endless conveyor 270 is connected with the previously mentioned drive shaft 256 through a motion transmitting mechanism 274, of any suitable type.

By reference to Figure 3, it will be seen that between the upper and lower flights of the flexible conveyor 270 there is positioned a flat supporting plate 278 of metal, having a generous number of perforations for the passage of the fluid drained from the slices. In addition, that portion of the plate 278 located below the level of the fluid in the tank is perforated for the free passage of the fluid in depositing slices on the upper flight of the reticulated conveyor and holding such slices in place on the conveyor until the ascent of the slices above the level of the fluid.

From Figure 3, it will be seen that the tank is provided with a lateral branch underlying a substantial portion of the discharge conveyor 270 to receive drainage therefrom.

It has been found that a portion of the starch extracted from the potato slices accumulates along with other matter, at the outlet end portion of the tank 234. Such accumulation is in the form of a rather light foam on and immediately beneath the surface of the liquid in the tank. As shown in Figures 2, 3 and 4, the surface starch is directed, by the spray from a spray head 280, across the tank in the general direction of a drain member 282. The drain member 282 extends above the conveyor 270 in spaced relation thereto and is provided with a longitudinal slot for the drainage of the surface starch. Clearly, the member 282 may be rotated sufficiently to vary the height of the starch receiving slot therein to provide for different liquid levels.

With further reference to the liquid level control, it will be seen that the location of the lower edge of the longitudinal slot in the member 282 determines the height of liquid within the tank. If the member 282 is rotatably adjusted to bring the lower edge of its slot higher, the liquid level within the tank will be raised accordingly. On the other hand, if the member 282 is oppositely rotated, the reverse is true and the liquid level is lowered.

When the liquid level is lowered, a greater cross-sectional area of the cylindrical discharge mouth 242' at the outer end of the tapered imperforate outlet portion 242 is exposed above the surface of the liquid, relieving the constriction of liquid being discharged from the drum, permitting an increase in the rate of discharge and thus decreasing the quantity of slices in the drum. This, of course, is reflected in a corresponding increase in the velocity of liquid circulating through the drum and results in shortening the period of washing. When the liquid level is raised, the discharge area of the drum mouth 242' is correspondingly decreased, thus checking the flow of liquid from the drum, correspondingly lengthening the period of washing in the drum, and permitting it to fill with more slices.

The outlet member 282 is shown in Figure 3 to be associated with a substantially U-shaped hood or deflector 284 having a horizontal top, a vertical back and a downwardly inclined bottom portion all of which are spaced about the member 282 to cooperate therewith in the formation of a passage for the adjacent foamy starch.

The main body of water from the spray head directly enters the collector 282 carrying with it the surface starch encountered thereby. However, a portion of the spray passes between the member 282 and the top of the deflector 284 carrying the foam encountered thereby around the back of the member 282 and into the tank liquid immediately below from where the foamy starch enters the member 282. It has been found that by directing the spray from the spray head 280 above and around in back of the member 282, the surface starch and the starch immediately below the surface is picked up in a highly efficient manner.

It is further illustrated in Figure 3 that at a point in back of the deflector 284 and in spaced parallel relation thereto there is a baffle 290 extending from a point above the tank to a point slightly above the ascending slices or chips on the conveyor 270 and slightly below the fluid level. The function of the baffle 290 is to cooperate with the back portion of the deflector 284 in defining a passage for the ascent of such foamy starch and floating dirt as may pass beyond the deflector 284. Such foamy starch as enters the space between the baffle 290 and the deflector 284 is directed upward and forward over the forward side of the deflector where it is picked up by the spray from the spray head 280 and is eventually conducted into the collector 282 along with that part of the surface starch picked up by the hood or deflector 284. This arrangement prevents the floating dirt and starch from continuing on the outlet conveyor with the discharging slices.

As clearly shown in Figures 1, 3 and 7, a cylindrical screen 295 surrounds the drain member 282 and extends for the full length of the longitudinal slot therein so as to prevent the passage of potato slices into the drain member through such slot.

Attention is invited to Figures 2 and 3 in which it is illustrated that a spray pipe 634 traverses the upper flight of the conveyor 270 at a point between the ends thereof and at a point above the same, and is formed with a series of orifices directed to spray the water laterally or more or less horizontally upon the slices above the surface of the water. The spray of fluid thus directed on to the ascending and as yet uncooked potato slices subjects the slices to a final washing, and it will be seen that the acute angle of the spray from the pipe 634, with respect to the path of travel of the ascending potato slices, has the effect of lifting the slices slightly above the conveyor. In Figure 3, it is clearly illustrated that the spray from the spray head 634 is in the general direction of travel of the potato slices on the conveyor 270 and at an acute angle to the path of such travel so as to cut under the potato slices and remove small particles of dirt therefrom without effecting a substantial disturbance in the distribution of the slices across the conveyor. That is to say, the action of the spray from the head 634 effects the removal of small particles of dirt from beneath the potato slices and leaves the potato slices relatively undisturbed on the conveyor.

Having thus described the invention, what is claimed is:

1. In a mechanism for treating potato slices, a tank for the reception of a treating liquid, a drum in the tank and extending below the level of liquid therein and being provided with inlet and outlet ends for potato slices, means to feed potato slices to the inlet end of the drum, there being means inducing a definite circulation of fluid through the drum from the inlet to the outlet ends of the drum and in the reverse direction below the drum to extract starch from the potato slices, a reticulated conveyor having a receiving end portion at the outlet end of the drum and located in the path of travel of the liquid whereby potato slices suspended in the liquid are deposited on the conveyor, a starch receiver traversing the conveyor at a point above the same and adjacent the fluid level in the tank, a hood surrounding the starch receiver in spaced relation thereto, and a spray device to direct a spray in the direction of said hood.

2. In a mechanism for treating potato slices, a tank for the reception of a treating liquid, a drum in the tank and extending below the level of liquid therein and being provided with inlet and outlet ends for potato slices, means to feed potato slices to the inlet end of the drum, there being means inducing a definite circulation of fluid through the drum from the inlet to the outlet ends of the drum and in the reverse direction below the drum, a reticulated conveyor having a receiving end portion at the outlet end of the drum and located in the path of travel of the liquid whereby potato slices suspended in the liquid are deposited on the conveyor, a receiver traversing the conveyor at a point above the same and adjacent the fluid level in the tank, a hood surrounding the receiver in spaced relation thereto, a spray device to direct a spray in the direction of said hood, and a baffle in spaced relation to said hood and in operative relation thereto to cooperate therewith in the formation of a passage for starch collected on the surface and adjacent the surface of the liquid in the tank.

3. In an apparatus for treating potato slices, a tank adapted for the reception of a treatment fluid, a drum positioned horizontally within said tank and formed of expanded metal having a series of webs extending in planes at acute angles to the respective intersecting radius lines of the drum and defining staggered openings, said webs constituting a means inducing an outward flow of fluid through the drum and thereby causing the potato slices within the drum to move outward into engagement with the inside wall of the drum.

4. In an apparatus for treating uncooked potato slices, a tank adapted for the reception of a treatment fluid, a rotatable drum positioned horizontally within said tank and formed of expanded metal having a series of webs extending in planes at acute angles to the respective intersecting radius lines of the drum and defining staggered openings, said webs constituting a means to induce an outward flow of fluid through the openings and thereby cause the potato slices within the drum to move outward into engagement with the inside wall of the drum, and means to induce a longitudinal flow of fluid through the drum.

5. In an apparatus for treating uncooked potato slices, a tank adapted for the reception of a treatment fluid, a rotatable drum positioned horizontally within said tank and formed of expanded metal having a series of webs extending in planes at acute angles to the respective intersecting radius lines of the drum and defining staggered openings, said webs constituting a means to induce an outward flow of fluid through the openings and thereby cause the potato slices within the drum to move outward into engagement with the inside wall of the drum, and means to induce a longitudinal flow of fluid through the drum, said drum extending above the level of fluid in said tank to cause the potato slices to fall away from the ascending side of the drum into the fluid below.

6. In an apparatus for treating uncooked potato slices, a tank adapted for the reception of a treatment fluid, a rotatable drum positioned horizontally within said tank, and formed of expanded metal having a series of webs extending in planes at acute angles to the respective intersecting radius lines of the drum and defining staggered openings, said webs constituting a means to induce an accelerated outward flow of fluid through the openings and thereby cause the potato slices within the drum to move outward into engagement with the inside wall of the drum, said drum extending above the level of fluid in said tank to cause the potato slices to fall away from the ascending side of the drum into the fluid below, a potato slice supply means at one end of the drum, and a receiver at the other end of the drum.

7. In a machine for treating uncooked potato slices and culling the same, a tank adapted for the reception of a treatment fluid, a rotatable drum positioned horizontally within the tank and having a reticulated body of expanded metal having a plurality of openings and connected webs extended in planes at acute angles to the respective radius lines of the drum and defining blades having the leading edges thereof presented inward to contact the fluid within the drum and induce an outward movement of such fluid through said openings, means to rotate said drum, said drum being extended above the level of the fluid in the tank to allow the potato slices to fall away from the ascending side of the drum at a point above the level of the fluid.

8. In a machine for washing and culling uncooked potato slices, a drum having a body formed of a reticulated material having blades joined at the intermediate and end portions thereof and disposed in planes extending at acute angles to the respective radius lines of the drum and constituting the sole means to form openings, a tank receiving the drum, and means to rotate the drum.

9. In an apparatus for treating uncooked potato slices, a tank adapted for the reception of a treatment fluid, a drum positioned horizontally within said tank and formed of expanded metal having a series of webs disposed in planes at acute angles to the respective intersecting radius lines of the drum and defining intervening staggered openings, said webs constituting a means inducing an outward flow of fluid through the intervening openings and thereby causing the potato slices within the drum to move outward into engagement with the inside wall of the drum, said drum having imperforate tapered end members provided with central openings for the passage of uncooked potato slices.

10. In an apparatus for treating uncooked potato slices, a tank adapted for the reception of a treatment fluid, a drum positioned horizontally within said tank and formed of expanded metal having a series of webs extending in planes at acute angles to the respective intersecting radius lines of the drum and defining staggered openings, said webs constituting a means inducing an outward flow of fluid through the drum and thereby causing the potato slices within the drum to move outward into engagement with the inside wall of the drum, said drum having imperforate tapered end members provided with central openings for the passage of uncooked potato slices, and impellers positioned closely within said tapered end members.

11. In an apparatus for treating uncooked potato slices and for separating the small, unusable potato slices from those of commercial size, a tank adapted for the reception of a treatment fluid, a rotatable drum positioned within the tank and formed of expanded metal having a series of webs extending in planes at acute angles to the respective intersecting radius lines of the drum and defining staggered openings, said openings being of a size to allow the passage of small, unusable slices whereby said unusable slices may settle to the bottom of the tank, and means to induce a longitudinal flow of fluid through the drum.

12. In an apparatus for washing uncooked potato slices, a tank for the reception of a treatment fluid, a slice receiving drum rotatable in the tank and having a side wall formed with a plurality of mutually and directly connected webs inclined transversely with respect to the intersecting radius lines of the drum and having leading edges presented inward to induce the rapid outward flow of fluid through said side wall and thereby urge the slices in the drum in the direction of said rapid flow of fluid.

13. In an apparatus for washing uncooked potato slices, a tank for the reception of a treatment fluid, a slice receiving drum rotatable in the tank and having a side wall formed with a plurality of webs inclined transversely with respect to the intersecting radius lines of the drum and having leading edges presented inward to induce the rapid outward flow of fluid through said side wall and thereby urge the slices in the drum in the direction of said rapid flow of fluid, said webs being mutually joined at the intermediate and end portions thereof.

14. In an apparatus for subjecting uncooked potato slices to a liquid bath, a tank for the reception of a slice treating liquid and having inlet and outlet portions for potato slices, a potato slice receiving member having a chamber extending below the level of the tank liquid and having a bottom provided with a plurality of spaced inlet orifices for tank liquid and directed generally toward the surface of the chamber liquid and toward said outlet, and a drum interfitting with the slice receiving member and having communication with the chamber thereof and having means inducing a definite pressure flow of liquid through the drum and up through said orifices to ebullate the chamber liquid up to the surface thereof, said slice receiving member being provided with a slidable mounting for movement of such member into and out of interfitting relation with said drum.

15. In a mechanism for subjecting potato slices to a liquid bath, a tank for the reception of potato slices and a liquid for treating such slices and having inlet and outlet portions, there being means inducing a definite circulation of tank liquid from the inlet to the outlet portions of the tank, a receiver adjacent the liquid level in the tank and having an inlet for matter to be discharged, and a spray device in spaced relation to said receiver and having means directing a spray of water across the surface of tank liquid toward the receiver to pick up intervening surface matter to be discharged and to conduct the same toward the receiver.

16. In a mechanism for subjecting potato slices to a liquid bath, a tank for the reception of potato slices and a liquid for treating such slices and having inlet and outlet portions, there being means inducing a definite circulation of tank liquid from the inlet to the outlet portions of the tank, a receiver adjacent the liquid level in the tank and having an inlet for matter to be discharged, a spray device in spaced relation to said receiver and having means directing a spray of water across the surface of tank liquid toward the receiver to pick up intervening surface matter to be discharged and to conduct the same toward the receiver, and a deflector in back of the receiver in spaced relation thereto and in the path of matter propelled by said spray device and having means directing such matter toward the inlet of said receiver.

17. In a mechanism for subjecting potato slices to a liquid bath, a tank for the reception of potato slices and a liquid for treating such slices and having inlet and outlet portions, there being means inducing a definite circulation of tank liquid from the inlet to the outlet portions of the tank, a receiver adjacent the liquid level in the tank and having an inlet for matter to be discharged, a spray device in spaced relation to said receiver and having means directing a spray of water across the surface of tank liquid toward the receiver to pick up intervening surface matter to be discharged and to conduct the same toward the receiver, a deflector in back of the receiver in spaced relation thereto and in the path of matter propelled by said spray device and having means directing such matter toward the inlet of said receiver, and a baffle in back of said deflector in spaced relation thereto and having means cooperating therewith in the formation of a passage for matter to be removed.

18. In an apparatus for subjecting uncooked potato slices to a liquid bath, a tank for the reception of a slice treating liquid, a rotatable reticulated drum positioned in said tank and having imperforate substantially tubular members at the inlet and outlet ends thereof and provided with openings disposed partly above and partly below the level of liquid in said tank, a potato slice receiving member in direct communication with the imperforate end member at the inlet end of said drum, said slice receiving member having a chamber and a bottom provided with a plurality of inlet orifices for tank liquid directed generally toward the surface of the liquid and toward the outlet of said drum, and impellers positioned in the imperforate end members of said drum for producing a definite pressure flow of fluid through the drum and up through said orifices to ebullate the chamber liquid therein, and a reticulated conveyor having a slice receiving portion immediately underlying said outlet end of the drum and in receptive relation to potato slices discharged from said drum.

19. In an apparatus for washing potato slices, a liquid holding tank, a drum disposed substantially horizontally in the tank liquid and having open axial inlet and outlet ends, said drum comprising a perforated cylindrical main body portion and imperforate end portions of substantial length around its inlet and outlet ends, means for feeding potato slices into the liquid adjacent the inlet end of the drum, means within said drum for creating a positive circulation of the tank liquid lengthwise through the drum and tank in the direction of the outlet end of the drum, said last-mentioned means comprising rotatable impellers positioned closely and wholly within said imperforate end portions and having an annular series of paddle blades angularly disposed with respect to the axis of the drum to promote an inflow and outflow of liquid at said inlet and outlet ends of substantially increased velocity relative to the movement of the liquid through the perforated body of the drum for forcibly drawing potato slices into and ejecting the same from the drum while permitting their relatively slow progression through the drum, and means for rotating said impellers.

20. In an apparatus for washing uncooked potato slices, a tank for the reception of a washing liquid, a substantially horizontally disposed drum in the tank liquid, said drum comprising a cylindrical perforated main body portion and imperforate tubular end members connected at their inner ends to said perforated main body portion, said end members being tapered toward the outer ends thereof to form reduced axial inlet and outlet openings at the opposite ends of the drum, means for feeding potato slices into the tank liquid adjacent the said inlet opening, and rotatable impeller means comprising bladed members positioned closely within said imperforate end members of said drum for effecting a positive circulation of the tank liquid lengthwise through the drum and tank in the direction of the said outlet opening of the drum, and means for rotating said impellers.

21. In an apparatus for washing uncooked potato slices, a tank for the reception of a washing liquid, a substantially horizontally disposed rotatable drum partially submerged in the tank liquid, said drum comprising a cylindrical perforated main body portion and imperforate tubular end members connected at their inner ends to said perforated main body portion, said end members being tapered toward the outer ends thereof to form reduced axial inlet and outlet openings at the opposite end of the drum disposed partly above and partly below the level of the tank liquid, means for feeding potato slices into the tank liquid adjacent the said inlet opening, rotatable impeller means comprising bladed members positioned closely within said imperforate end members of said drum for effecting a positive circulation of the tank liquid lengthwise through the drum and tank in the direction of the said outlet opening of the drum, means for rotating said drum and impellers, and means carried by the inner periphery of the perforated main body portion of the drum for intermittently engaging the potato slices and carrying the same through the liquid in arcuate paths and releasing the slices for floating upon the surface of the flowing liquid.

22. In an apparatus for washing uncooked potato slices, a tank for the reception of a washing liquid, a substantially horizontally disposed rotatable drum partially submerged in the tank liquid, said drum comprising a cylindrical perforated main body portion and imperforate tubular end members connected at their inner ends to said perforated main body portion, said end members being tapered toward the outer ends thereof to form reduced axial inlet and outlet openings at the opposite ends of the drum disposed partly above and partly below the level of the tank liquid, means for feeding potato slices into the tank liquid adjacent the said inlet opening, rotatable impeller means comprising bladed members positioned closely within said imperforate end members of said drum for effecting a positive circulation of the tank liquid lengthwise through the drum and tank in the direction of the said outlet opening of the drum, means for rotating said drum and impellers, and circumferentially spaced, longitudinally extending ribs carried by the inner periphery of the perforated main body portion of the drum for intermittently carrying the slices through the treating liquid in arcuate paths and releasing the slices on the surface of the liquid to permit floating of the same with the lengthwise movement of the liquid and from one side of the drum to the other.

23. In an apparatus for washing potato slices, a tank for the reception of a washing liquid, a rotatable substantially horizontally disposed drum partially submerged in the tank liquid, said drum including a perforated main body portion and imperforate tubular end members, said end members being tapered toward their outer ends to provide reduced inlet and outlet openings at the opposite ends of the drum, a slice receiving member directly communicating with said inlet opening, said slice receiving member extending below the level of the liquid in said tank and having a perforated bottom wall, means for feeding slices into the liquid in said slice receiving member, a reticulated discharge conveyor having a slice receiving portion extending below the level of the liquid in the tank and immediately beneath the outlet opening of the drum, bladed impellers positioned closely within said imperforate end members and rotatable with said drum for effecting a positive circulation of the tank liquid through said drum and tank in the direction of the outlet opening of the drum, downwardly through said conveyor and beneath the drum and up through the perforated bottom of said slice receiving member and through the inlet opening of the drum, and means for rotating said drum.

24. In an apparatus for washing potato slices, a tank for holding a washing liquid, a substantially horizontally disposed drum in the upper portion of the tank liquid and having open inlet and outlet ends for the tank liquid and potato slices, means for feeding potato slices to the inlet end of the drum, a reticulated conveyor having a receiving portion underlying the outlet end of said drum and in effect forming a partition between the outlet end of the drum and the lower portion of the tank, and impeller means within the drum for inducing a positive circulation of liquid through the inlet end of the drum, out the outlet end of the drum, over and down through the reticulated conveyor and beneath the drum back toward the inlet end of the drum whereby the potato slices carried by the liquid are deposited on the reticulated conveyor.

25. In an apparatus for washing potato slices, a liquid holding tank, a substantially horizontally disposed drum in the upper portion of the tank liquid and having open intake and discharge ends for the tank liquid and potato slices, the discharge end portion of said drum embodying an imperforate hollow member tapering toward the outer end thereof to provide a reduced outlet opening at the discharge end of the drum, means for feeding potato slices to the intake end of the drum, a reticulated discharge conveyor having a receiving portion submerged immediately beneath the said outlet opening at the discharge end of the drum and in effect forming a partition between the discharge end of the drum and the lower portion of the tank, and means in the drum to effect a positive circulation of the tank liquid through the intake end of the drum, out the said outlet opening, over and down through the reticulated conveyor and beneath the drum back toward the intake end of the drum, whereby potato slices carried by the liquid are deposited on the reticulated conveyor, said last-mentioned means including a bladed impeller closely positioned within the imperforate member at the discharge end of the drum.

26. In an apparatus for washing potato slices, a liquid holding tank, a rotatable substantially horizontally disposed drum in the upper portion of the tank liquid, means for rotating said drum, said drum being provided with open inlet and outlet ends, a reticulated conveyor having a receiving portion submerged in the tank liquid immediately beneath the outlet end of said drum and in effect forming a partition between the outlet end of the drum and the lower portion of the tank, impeller means within said drum for inducing a positive circulation of the tank liquid through the inlet end of the drum, out the outlet of the drum, downwardly through said conveyor and beneath the drum in the reverse direction back to the inlet end of the drum, means for feeding potato slices into the circulating liquid adjacent the inlet end of the drum, and means carried by the inner periphery of the drum for intermittently carrying the potato slices through the liquid in arcuate paths and releasing the same for floating upon the surface of the flowing liquid.

27. In an apparatus for washing uncooked potato slices, a liquid holding tank, an open-ended substantially horizontally disposed drum partially submerged in the tank liquid and having an imperforate tapered intake end section provided with an inlet opening disposed partly above and partly below the level of the tank liquid, a slice receiving member having a chamber independently of the tank walls and extending below the level of the tank liquid, said chamber communicating directly with the inlet opening of the drum and being provided with a perforated bottom, means for feeding potato slices to the chamber of said slice receiving member, a rotatable impeller in said imperforate intake end section of the drum for causing a flow of liquid lengthwise of the drum and for drawing liquid forcibly through the perforated bottom of the slice receiving member to agitate the liquid and potato slices therein and to forcibly draw the slices into the drum, and means for rotating said impeller.

28. In an apparatus for washing uncooked potato slices, a liquid holding tank, an open-ended rotatable substantially horizontally disposed drum partially submerged in the tank liquid, said drum including a cylindrical perforated main body portion and an imperforate tapered end section provided with a reduced inlet opening, a slice receiving member having a chamber independently of the tank walls and extending below the level of the tank liquid, said chamber being provided with a perforated bottom and a discharge channel communicating directly with said reduced inlet opening, said inlet opening and said channel being disposed partly above and partly below the level of the tank liquid, means for feeding potato slices into the chamber liquid, a rotatable impeller positioned closely and wholly within said imperforate end section of the drum for causing a flow of liquid lengthwise of the drum and for drawing liquid forcibly through the perforated bottom of the slice receiving member to agitate the liquid and potato slices therein and to forcibly draw the slices into the drum, and means for rotating said drum and impeller.

29. In an apparatus for treating articles of food, a tank for the reception of a treating liquid, a substantially horizontally disposed drum in the tank liquid and having open intake and discharge ends, the discharge end portion of said drum embodying an imperforate hollow member tapering toward the outer end thereof to provide a reduced outlet opening at the discharge end of the drum, means for feeding articles of food to the intake end of the drum, impeller means in said drum to effect a positive circulation of the tank liquid therethrough in the direction of the discharge end, and an adjustable overflow for varying the liquid level in the tank and at the outlet opening of the drum to regulate the flow of liquid and articles of food through said drum.

30. In an apparatus for treating articles of food, a tank for the reception of a treating liquid, a substantially horizontally disposed drum in the tank liquid and having open intake and discharge ends, said drum comprising a cylindrical perforated main body portion and an imperforate tubular member at the discharge end thereof, said tubular member being connected at its inner end to said perforated main body portion and tapered toward the outer end thereof to provide a reduced outlet opening at the discharge end of the drum, said outlet opening being disposed partly above and partly below the level of the liquid in said tank, means for feeding articles of food to the intake end of said drum, impeller means in the drum to effect a positive circulation of the tank liquid therethrough in the direction of the discharge end, and an adjustable overflow for varying the liquid level in the tank and at the outlet opening of the drum to regulate the flow of liquid and articles of food through the drum.

JOSEPH D. FERRY.